United States Patent [19]
Li

[11] 4,382,128
[45] May 3, 1983

[54] POLYOLEFIN GRAFTED WITH POLYCARBOXYLIC ACID, ESTER OR ANHYDRIDE AND MODIFIED WITH POLYHYDROXY COMPOUND

[75] Inventor: George S. Li, Macedonia, Ohio
[73] Assignee: Standard Oil Company, Cleveland, Ohio
[21] Appl. No.: 262,769
[22] Filed: May 11, 1981

Related U.S. Application Data

[63] Continuation-in-part of Ser. No. 172,896, Jul. 28, 1980, abandoned.
[51] Int. Cl.³ .................. C08F 255/02; C08L 23/06
[52] U.S. Cl. .................................. 524/513; 525/285; 525/301; 525/304; 524/531; 524/533
[58] Field of Search ................ 525/285, 168; 524/513
[56] References Cited

U.S. PATENT DOCUMENTS 4,079,102  3/1978  Wagner et al. .................. 525/166
4,146,590  3/1979  Yamamoto et al. ............... 525/168

FOREIGN PATENT DOCUMENTS 52067  10/1966  Poland ............................. 525/285
1066873  4/1967  United Kingdom ............... 525/285

Primary Examiner—Wilbert J. Briggs, Sr.
Attorney, Agent, or Firm—William D. Mooney; Herbert D. Knudsen; Larry W. Evans

[57] ABSTRACT

Moldable polyolefin compositions exhibiting improved heat distortion and modulus characteristics, and a method of preparing such compositions are described. The method of preparing these polyolefin compositions comprises reacting (a) a graft-modified polyolefin obtained by reacting a polyolefin with an unsaturated polycarboxylic acid, ester or anhydride which is graft-polymerizable therewith, and
(b) at least one organic hydroxy compound. These polyolefin compositions can be reinforced with fibers, minerals and fillers for particular applications.

18 Claims, No Drawings

POLYOLEFIN GRAFTED WITH POLYCARBOXYLIC ACID, ESTER OR ANHYDRIDE AND MODIFIED WITH POLYHYDROXY COMPOUND

This application is a continuation-in-part of U.S. Application Ser. No. 172,896, filed July 28, 1980, now abandoned. The disclosure of said prior application is hereby incorporated by reference in this application in its entirety.

BACKGROUND OF THE INVENTION

This invention relates to polyolefin compositions having improved properties and to a method of preparing such compositions. More particularly, this invention relates to a process for improving the properties of graft-modified polyolefins.

The preparation of graft-modified resins by grafting unsaturated polycarboxylic acids, esters or anhydrides such as maleic acid, maleic anhydride, or a maleic acid ester to an olefin polymer or copolymer to improve the adhesive properties of the resin is known. Such graft-modified polyethylene, polypropylene and copolymers thereof have been described in the literature and are available commercially.

The modification of polypropylene polymers, both crystalline and amorphous by reaction of maleic anhydride has been described in Belgian Pat. No. 652,324. In U.S. Pat. No. 3,414,551, an improved process for reacting maleic anhydride with crystalline propylene polymer is described. In general, from about 0.2 to about 10% of maleic anhydride is incorporated into the polymer utilizing an organic peroxygen compound in the absence of any solvent. British Pat. No. 1,441,189 describes a process for preparing a graft-modified ethylene polymer or copolymer by reacting an ethylene polymer or copolymer with a dicarboxylic acid graft-copolymerizable therewith or with a graft-copolymerizable derivative of such a dicarboxylic acid in an alkyl-substituted aromatic hydrocarbon solvent in the presence of a free radical initiator. The dicarboxylic acid or its derivative is added gradually to a mixture of the solvent and the starting ethylene polymer or copolymer during the grafting reaction.

Additional examples of patents and publications which describe the preparation of graft-modified polyolefins include U.S. Pat. Nos. 3,856,889; 3,480,580 and 3,481,910, Japanese Patent Publication No. 15422/69 published on July 9, 1969 and Japanese Patent Publication No. 6384/64, published on May 4, 1964. U.S. Pat. No. 3,856,889 describes blends containing polyethylene and graft-modified polyolefins. These blends are reputed to have good melt stability and good adhesion to paperboards and inks. Stabilizers can be included in the blends to prevent gelation or degradation of the blend properties, and these include dilauryl thiodipropionate, butylated hydroxytoluene, dioctadecyl p-cresol and 2,2'-methylene bis(6-tert-butyl-p-cresol).

U.S. Pat. No. 4,146,590 discloses a process for the modification of polyolefins by the combination of such polyolefins with one or more alicyclic carboxylic acids having a cis form non-conjugated double bond in the ring, alpha,beta-unsaturated carboxylic acids, their anhydrides or mixtures thereof, in the presence of a radical producing agent in an extruder, wherein during or after the above described addition reaction, the modified polyolefin under molten state is reacted with one or more polyfunctional compounds having at least two alcoholic hydroxyl groups or amino groups. This patent teaches that the level of addition of the polyfunctional compound is in the range of 0.1 to 2 molar equivalents or less, preferably 0.1 to 1.2, to all the carboxylic acid or anhydride thereof contained in the modified polyolefin. The working examples provided in this patent teach the utilization of molar ratios of the polyfunctional compounds to unreacted carboxylic acid or anhydride thereof of less than 2:1.

SUMMARY OF THE INVENTION

It now has been found that the properties of polyolefins which have been graft-modified with an unsaturated polycarboxylic acid, ester or anhydride can be improved by reacting the graft-modified polyolefin with at least one organic polyhydroxy compound. In particular, the heat distortion, strength and modulus characteristics are improved by the reaction with the polyhydroxy compound. In one embodiment, the graft-modified polyolefin is dissolved in a suitable solvent and the polyhydroxy compound is added to the heated solution. The polyolefin compositions prepared in accordance with the invention can be reinforced with fibers, minerals or fillers to obtain special effects.

DESCRIPTION OF THE PREFERRED EMBODIMENTS

In accordance with the present invention, polyolefin compositions having improved properties can be prepared by a method which comprises reacting
  (a) a graft-modified polyolefin obtained by reacting a polyolefin with an unsaturated polycarboxylic acid, ester or anhydride which is graft-polymerizable therewith, and
  (b) at least one organic polyhydroxy compound, the molar ratio of said organic polyhydroxy compound to unreacted unsaturated polycarboxylic acid, ester or anhydride present in (a) being at least 2:1, preferably at least about 5:1.

Generally, the reaction will be conducted in a suitable heated solvent or in a reactor/extruder.

As mentioned above, the graft-modified polyolefins have been described in the literature and are available commercially. In general, the modified polyolefins are prepared from polyolefins derived from a monoolefin containing from about 2 to 12 carbon atoms, mixtures thereof, or mixtures of one or more monoolefins with a diolefin containing up to about 12 carbon atoms. Examples of such olefins include ethylene, propylene, butene-1,4-methyl-1-pentene, 3-methyl-1-butene, 4,4-dimethyl-1-pentene, 3-methyl pentene-1, 4-methyl hexene-1, 5-ethyl hexene-1, 6-methyl heptene-1, hexene-1, heptene-1, octene-1, nonene-1, decene-1 and dodecene-1, etc. Examples of diolefins include butadiene, 1,3-pentadiene, 1,3-hexadiene, 4-methyl-1,3-pentadiene, etc. Examples of olefin copolymers useful in the invention include: copolymers of ethylene with propylene, butene-1, hexene-1 and dienes such as butadiene; and the copolymers of propylene with ethylene, butene-1, hexene-1 and dienes such as butadiene. Copolymers of, e.g., ethylene or propylene with acrylic acids such as acrylic acid, methacrylic acid, methyl acrylate and methyl methacrylate also are useful. Specific examples of some copolymers include 90/10 propylene/1-butene; 50/50 propylene/1-butene; 95/5 propylene/1-pentene; 90/10 propylene/1-hexene; 80/20 propylene/4-methyl-1-pentene; 75/25 propylene/dodecene; 90/10 1-butene/1-hexene;

75/25 ethylene/propylene. Polymers of ethylene and propylene are preferred. The propylene polymers can be either crystalline or amorphous and thermally degraded crystalline polypropylene particularly is useful.

The choice of polyolefin to be graft-modified will depend in part on the properties desired in the product of the reaction such as rigidity, density, or crystallinity. These properties can be obtained or modified by varying the polyolefin or copolyolefin selected according to composition, molecular weight, polymerization catalyst and the polymerization conditions, all of which are within the knowledge of those skilled in this art.

Suitable unsaturated polycarboxylic acids containing from 2 to about 6 carboxylic acid groups, and anhydrides thereof include, for example, maleic acid, fumaric acid, mesaconic acid, citraconic acid, aconitric acid and itaconic acid, 5-norbornene-2,3-dicarboxylic acid, 1,2,3,6-tetrahydrophthalic acid, and the anhydrides thereof. Suitable esters include, for example, the half or full esters derived from the above acids including methyl, ethyl, dimethyl maleate, dimethyl fumarate, methyl ethyl maleate, dipropyl maleate, dibutyl maleate, etc., or those compounds which form these compounds at elevated reaction temperatures such as citric acid. In one preferred embodiment the polyolefin is grafted with maleic acid, maleic anhydride or esters of maleic acid.

The graft-modified polyolefins useful in the present invention can be prepared by reacting the polyolefin with varying amounts of the unsaturated polycarboxylic acid, ester or anhydride. In one preferred embodiment, the polyolefin is reacted with from about 0.1 to about 10 weight percent of the polycarboxylic acid, ester or anhydride.

The procedures for preparing the graft-modified polyolefin compositions of the invention are well known in the art, and it is not believed necessary to lengthen this specification by describing the procedure in detail. The polyolefin can be reacted with the unsaturated polycarboxylic acid dissolved in a solvent, or the reaction can be conducted neat under melt conditions. Moreover, the reaction can be conducted utilizing an oxygen or peroxide catalyst, or, as reported in U.S. Pat. No. 3,481,910, in the absence of oxygen or catalyst.

The preparation of graft-modified ethylene polymers and copolymers in an alkyl-substituted aromatic hydrocarbon solvent in the presence of a free radical initiator is described in British Pat. No. 1,441,189. In this procedure, the polycarboxylic acid or its derivative is added gradually to a mixture of the solvent and the starting ethylene polymer or copolymer as the grafting reaction proceeds. It is not critical when the initiator is added, and the initiator can be added all at once to the reaction system at the beginning or a part or all of the initiator can be added separately at any desired rate or simultaneously with the polycarboxylic acid or its derivative. The alkyl-substituted aromatic hydrocarbon solvents which are used in the process have at least one alkyl group in the aromatic ring, is liquid under the reaction conditions, and can dissolve a starting polyethylene or ethylene copolymer, polycarboxylic acid or its derivative and the initiator. The alkyl group may have a straight chain or a branched chain. Examples of such solvents include toluene, xylene, ethyl benzene, cumene and cymene.

The free radical initiators that can be used in this method are any conventional radical initiators such as organic peroxy compounds and azonitriles. Examples of the organic peroxy compounds are alkyl peroxides such as diisopropyl peroxide, ditertiary butyl peroxide and tertiary butyl hydroperoxide; aryl peroxide such as dicumyl peroxide and cumyl hydroperoxide; acyl peroxide such as dilauryl peroxide; ketone peroxide such as methyl ethyl ketone peroxide and cyclohexanone peroxide. Examples of azonitriles are azo bisbutyronitrile and azobisisopropionitrile.

As an example of this process of the invention, the dicarboxylic acid or its derivative is fed at a feed rate of from about $10^{-5}$ to $10^{-2}$ mole/hour into a reaction system consisting of 1000 parts by volume of the alkyl-substituted aromatic hydrocarbon solvent, 10 to 300 parts by weight of polyethylene and 0.005 to 5 parts by weight of the radical initiator. Alternatively, a part or all of the radical initiator can be added together with the dicarboxylic acid or its derivative. The reaction is conducted at a temperature which is above the point at which the starting polymer or copolymer swells with, or dissolves in, the solvent. Higher temperatures can be utilized so long as there is no appreciable cleavage of the molecular chain of the polymer or copolymer or the graft-modified product. Additional details of this method for preparing graft-modified polyolefins is found in British Pat. No. 1,441,189, which specification is included herein by reference.

A procedure for graft-modifying propylene polymers in the absence of solvents is described in U.S. Pat. No. 3,414,551. This process comprises fluidizing said polymers in particulate form in contact with vapors of maleic anhydride and inorganic peroxygen compound in an atmosphere of inert gas at a temperature of from about 80° C. up to a temperature about ten degrees below the melting point of the polymer for a period of time sufficient to cause a chemical reaction of the polymer with from about 0.2 to 10% of maleic anhydride based on the weight of the polymer. The amount of peroxygen compound can vary between about 0.5 to about 5% by weight of the polymer. The graft-modified polymer recovered from this reaction is washed with a solvent such as acetone to remove impurities.

Processes for preparing graft-modified polyolefins from thermally degraded polyolefins also have been described in the literature. In U.S. Pat. No. 3,480,580 thermally degraded polyolefins prepared from monoolefins containing at least 3 carbon atoms are reacted with organic unsaturated polycarboxylic acids, acid anhydrides and acid esters in the presence of a free radical source, and U.S. Pat. No. 3,481,910 describes a similar process conducted in the absence of oxygen or a free radical source. The thermally degraded polyolefins which are reacted with the polycarboxylic acid have a melt viscosity range of from about 100 to about 5000 cp at 190° C. (ASTM-D1238-57T) and an inherent viscosity of about 0.1 to 0.5. The thermally degraded polyolefins are reacted with unsaturated polycarboxylic acids, anhydrides or esters thereof at elevated temperatures. When a free radical source is utilized in the process, the temperature generally will be less than 300° C. and preferably between about 150°-250° C. In the absence of free radical initiators, the reaction temperature generally will be about 200° C.

The graft-modified polyolefins obtained by the procedures described in U.S. Pat. Nos. 3,480,580 and 3,481,910 are characterized as having a melt viscosity of between 100 and 5000 centipoise at 190° C., and a saponification number of between about 6 and 60 and preferably between about 7-14. The inherent viscosity of these products generally is less than about 0.5 and preferably between about 0.1 and 0.4.

Maleated polypropylenes are available commercially. For example, Hercules Incorporated offers such products under the following general trade designations: Hercoprime Resin G-35; Hercoprime Resin A-35; and Hercotuf.

A wide variety of polyhydroxy compounds can be reacted with the graft-modified polyolefins described above in accordance with the present invention. In general, the graft-modified polyolefins are reacted with from about 0.5 to about 10% by weight of at least one organic polyhydroxy compound. When the graft modified polyolefins contain unreacted amounts of the unsaturated polycarboxylic acid, ester or anhydride, it is preferred to add the polyhydroxy compounds at sufficient levels so that the molar ratio of the polyhydroxy compounds to unreacted amounts of unsaturated polycarboxylic acid, ester or anhydride is at least 2:1, preferably at least about 5:1. Molar ratios of the polyhydroxy compound to the unreacted unsaturated polycarboxylic acid, ester or anhydride of less than about 2:1 tend to reduce the heat distortion, strength and modulus characteristics of the resulting polyolefin compositions. The upper limits to the ratio of polyhydroxy compound to the level of unreacted unsaturated polycarboxylic acid, ester or anhydride are dictated by the overall level of addition of organic polyhydroxy compound to the graph modified polyolefins, as indicated above. Examples of the polyhydroxy compounds include the aliphatic, cycloaliphatic and aromatic polyhydroxy compounds and such compounds may be monomeric or polymeric. The organic polyhydroxy compounds useful in this invention may contain other functionality including ether groups, ester groups, etc.

Suitable monomeric polyols or polyhydroxy compounds, including aliphatic, cycloaliphatic and aromatic compounds for use in accordance with this invention include
ethylene glycol,
propylene glycol,
trimethylene glycol,
1,2-butylene glycol,
1,3-butane diol
1,4-butane diol,
1,5-pentane diol,
1,2-hexylene glycol,
1,10-decane diol,
1,2-cyclohexane diol,
2-butene-1,4diol
3-cyclohexane-1,1-dimethanol,
4-methyl-3-cyclohexene,1,1-dimethanol,
3-methylene-1,5-pentanediol,
3,2-hydroxyethyl cyclohexanol,
2,9-para-methanediol,
2,2,4-trimethyl-1,3-pentanediol,
2,5-dimethyl-2,5-hexane diol
and the like; alkylene oxide modified diols such as
diethylene glycol,
(2-hydroxyethoxy)-1-propanol,
4-(2-hydroxyethoxy)-1-butanol,
5-(2-hydroxyethoxy)-1-pentanol,
3-(2-hydroxypropoxy)-1-propanol,
4-(2-hydroxypropoxy)-1-butanol,
5-(2-hydroxypropoxy)-1-pentanol,
1-(2-hydroxyethoxy)-2-butanol,
1-(2-hydroxyethoxy)-2-pentanol,
1-(2-hydroxymethoxy)-2-hexanol,
1-(2-hydroxyethoxy)-2-octanol,
and the like.

Representative examples of ethylenically unsaturated low molecular weight polyols include
3-allyloxy-1,5-pentanediol;
3-allyloxy-1,2-propanediol;
2-allyloxymethyl-2-methyl-1,3-propanediol;
2-methyl-2-[(4-pentenyloxy)methyl]-1,3-propanediol; and
3-(o-propenylphenoxy)-1,2-propanediol.

Representative examples of low molecular weight polyols having at least 3 hydroxyl groups include
glycerol;
1,2,6-hexanetriol;
1,1,1-trimethylolpropane;
1,1,1-trimethylolethane;
pentaerythritol;
3-(2-hydroxyethoxy)-1,2-propanediol;
3-(2-hydroxypropoxy)-1,2-propanediol;
6-(2-hydroxypropoxy)-1,2-hexanediol;
2-(2-hydroxyethoxy)-1,2-hexanediol;
6-(2-hydroxypropoxy)-1,2-hexanediol;
2,4-dimethyl-2-(2-hydroxyethoxy)methylpentanediol-1,5:mannitol;
glactitol;
talitol;
iditol;
allitol;
altritol;
guilitol;
arabitol;
ribitol;
xylitol;
erythritol;
threitol;
1,2,5,6-tetrahydroxyhexane;
meso-inisitol;
sucrose;
glucose;
galactose;
mannose;
fructose;
xylose;
arabinose;
dihydroxyacetone;
glucose-alpha-methylglucoside;
1,1,1-tris[2-hydroxyethoxy)methyl]ethane; and
1,1,1-tris[(2-hydroxypropoxy)methyl]propane.

Exemplary diphenylol compounds include 2,2-bis(p-hydroxyphenyl)propane; bis(p-hydroxyphenylmethane and the various diphenols and diphenylol methanes disclosed in U.S. Pat. Nos. 2,506,486 and 2,744,882, respectively.

Exemplary triphenylol compounds which can be employed include the alpha, alpha, omega, tris(hydroxyphenyl)alkanes such as
1,1,3-tris(hydroxyphenyl)ethane;
1,1,3-tris(hydroxyphenyl)propane;
1,1,3-tris(hydroxy-3-methylphenyl)propane;
1,1,3-tris(dihydroxy-3-methylphenyl)propane;
1,1,3-tris(hydroxy-2,4-dimethylphenyl)propane;
1,1,3-tris(hydroxy-2,5-dimethylphenyl)propane;
1,1,3-tris(hydroxy-2,6-dimethylphenyl)propane;
1,1,4-tris(hydroxyphenyl)butane;
1,1,4-tris(hydroxyphenyl)-2-ethylbutane;
1,1,4-tris(dihydroxyphenyl)butane;
1,1,5-tris(hydroxyphenyl)-3-methylpentane;
1,1,8-tris(hydroxyphenyl)-octane; and 1,1-10-tris(hydroxyphenyl)decane.

Tetraphenylol compounds which can be used in this invention include the alpha, alpha, omega, omega, tetrakis(hydroxyphenyl)alanes such as 1,1,2,2-tetrakis(hydroxy-phenyl)ethane;
1,1,3,3-tetrakis(hydroxy-3-methylphenyl)propane;
1,1,3,3-tetrakis(dihydroxy-3-methylphenyl)propane;
1,1,4,4-tetrakis(hydroxyphenyl)butane;
1,1,4,4-tetrakis(hydroxyphenyl)-2-ethylbutane;
1,1,5,5-tetrakis(hydroxyphenyl)pentane;
1,1,5,5-tetrakis(hydroxyphenyl)-3-methylpentane;
1,1,5,5-tetrakis(dihydroxyphenyl)pentane;
1,1,8,8-tetrakis(hydroxy-3-butyl-phenyl)octane;
1,1,8,8-tetrakis(dihydroxy-3-butylphenyl)octane;
1,1,8,8-tetrakis(hydroxy-2,5-dimethylphenyl)octane;
1,1,10,10-tetrakis(hydroxyphenyl)decane, and the corresponding compounds which contain substituent groups in the hydrocarbon chain such as 1,1,6,6-tetrakis(hydroxyphenyl)-2-hydroxyhexane;
1,1,6,6-tetrakis(hydroxyphenyl)-2-hydroxy-5-methylhexane; and
1,1,7,7-tetrakis(hydroxyphenyl)-3-hydroxyheptane.

By polymeric polyhydroxy compound is meant a linear long-chain polymer having terminal hydroxyl groups including branched, polyfunctional polymeric hydroxy compounds as set forth below. Among the suitable polymeric polyhydroxy compounds, there are included polyether polyols such as polyalkyleneether glycols and polyalkylene-aryleneether-thioether glycols, polyalkyleneether triols. Mixtures of these polyols may be used when desired.

The polyalkyleneether glycols may be represented by the formula HO(RO)$_n$H, wherein R is an alkylene radical which need not necessarily be the same in each instance and n is an integer. Representative glycols include polyethyleneether glycol, polypropyleneether glycol, polytrimethyleneether glycol, polytetramethylene ether glycol, polypentamethyleneether glycol, polydecamethyleneether glycol, polytetramethylene formal glycol and poly-1,2-dimethylethyleneether glycol. Mixtures of two or more polyalkyleneether glycols may be employed if desired.

The organic polyhydroxy compounds may be polyoxyalkylene compounds such as obtained by condensation of an excess of one or more alkylene oxides with an aliphatic or aromatic polyol. Ethylene oxide condensation products are preferred. Such polyoxyethylene compounds are available commercially under the general trade designations "Surfynol" by Air Products and Chemicals, Inc. of Wayne, Pa., and under the designation "Pluronic" or "Tetronic" by BASF Wyandotte Corp. of Wyandotte, Mich. Examples of specific polyoxyethylene condensation products useful in the invention include "Surfynol 465" which is a product obtained by reacting about 10 moles of ethylene oxide with 1 mole of tetramethyldecynediol. "Surfynol 485" is the product obtained by reacting 30 moles of ethylene oxide with tetramethyldecynediol. "Pluronic L 35" is a product obtained by reacting 22 moles of ethylene oxide with polypropylene glycol obtained by the condensation of 16 moles of propylene glycol.

Carbowax-type compositions which are polyethylene glycols having different molecular weights have been found to give good results. For example Carbowax No. 1000 has a molecular weight range of from about 950 to 1,050 and contains from 20 to 24 ethoxy units per molecule. Carbowax No. 4000 has a molecular weight range of from about 3000 to 3700 and contains from 68 to 85 ethoxy units per molecule. Other known nonionic glycol derivatives such as polyalkylene glycol ethers and methoxy polyethylene glycols which are available commercially can be utilized.

Representative polyalkyleneether triols are made by reacting one or more alkylene oxides with one or more low molecular weight aliphatic triols. The alkylene oxides most commonly used have molecular weights between about 44 and 250. Examples include: ethylene oxide; propylene oxide; butylene oxide; 1,2-epoxybutane; 1,2-epoxyhexane; 1,2-epoxyoctane; 1,2-epoxyhexadecane; 2,3-epoxybutane; 3,4-epoxyhexane; 1,2-epoxy-5-hexene; and 1,2-epoxy-3-butane, and the like. Ethylene, propylene, and butylene oxides are preferred. In addition to mixtures of these oxides, minor proportions of alkylene oxides having cyclic substituents may be present, such as styrene oxide, cyclohexene oxide, 1,2-epoxy-2-cyclohexylpropane, and a methyl styrene oxide. The aliphatic triols most commonly used have molecular weights between about 92 and 250. Examples include glycerol, 1,2,6-hexanetriol; 1,1,1-trimethylolpropane; 1,1,1-trimethylolethane; 2,4-dimethylol-2-methylol-pentanediol-1,5 and the trimethylether of sorbitol.

Representative examples of the polyalkyleneether triols include: polypropyleneether triol (M.W. 700) made by reacting 608 parts of 1,2-propyleneoxide with 92 parts of glycerine; polypropyleneether triol (M.W. 1535) made by reacting 1401 parts of 1,2-propyleneoxide with 134 parts of trimethylolpropane; polypropyleneether triol (M.W. 2500) made by reacting 2366 parts of 1,2-propyleneoxide with 134 parts of 1,2,6-hexanetriol; and polypropyleneether triol (M.W. 6000) made by reacting 5866 parts of 1,2-propyleneoxide with 134 parts of 1,2,6-hexanetriol.

Additional suitable polytriols include polyoxypropylene triols, polyoxybutylene triols, Union Carbide's Niax triols LG56, LG42, LG112 and the like; Jefferson Chemical's Triol G-4000 and the like; Actol 32-160 from National Aniline and the like.

The polyalkylene-aryleneether glycols are similar to the polyalkyleneether glycols except that some arylene radicals are present. Representative arylene radicals include phenylene, naphthalene and anthracene radicals which may be substituted with various substituents, such as alkyl groups. In general, in these glycols there should be at least one alkyleneether radical having a molecular weight of about 500 for each arylene radical which is present.

The polyalkyleneether-thioether glycols and the polyalkylenearyleneether glycols are similar to the above-described polyether glycols, except that some of the etheroxygen atoms are replaced by sulfur atoms. These glycols can be prepared conveniently by condensing together various glycols such as thiodiglycol, in the presence of a catalyst such as p-toluene-sulfonic acid.

Other polyhydroxy compounds which can be reacted with the graft-modified polyolefins include copolymers derived from allyl alcohol and copolymers of allyl alcohol with, for example, styrene. One copolymer which has been found useful in the method of the present invention is a copolymer of styrene and allyl alcohol available from Monsanto under the general trade designation "RJ-100".

The reaction of the polyhydroxy compound with the graft-modified polyolefins in accordance with the invention can be effected in solution at elevated temperatures or the mixture can be reacted in the absence of a solvent in a reactor/extruder. Any solvent in which the graft-modified polyolefin and the polyhydroxy compound are soluble can be utilized. Alkyl-substituted aromatic hydrocarbon solvents are particularly useful and these include toluene, xylene, ethyl benzene, cumene, cymene and mixtures of any of these. Aliphatic solvents such hexane, heptene or kerosene can be utilized when the components of the reaction are soluble therein.

In one preferred embodiment, the modified polyolefin is dissolved in boiling toluene to provide, for example, a 10% solution of the polyolefin. The polyhydroxy compound is added to the solution and the mixture is stirred with heating for 1 to 2 hours to ensure completion of the reaction. When the reaction solution cools, the desired product solidifies whereupon the solid is ground to a powder, washed with acetone to remove impurities and dried.

The compositions which are prepared in accordance with the method of the invention exhibit improved heat distortion characteristics, strength and flexural modulus.

Other ingredients may be dispersed into the polyolefin compositions of the invention either by incorporating the ingredients into the reaction mixture either prior to, during or after the reaction is completed. To obtain special effects, include one or more of the following: fibrous reinforcing materials, fillers, pigments, mold release agents, colorants, flame retardants, etc. In general, these ingredients can be incorporated in quantities of from 5% to about 75% by weight of the composition although amounts up to about 40 to 50% generally represent a practical upper limit of the amount of these added ingredients.

Fibrous reinforcing materials can be added to the polyester resin compositions of the invention for the purpose of imparting strength and other desirable physical properties to the cured products formed therefrom. Examples of fibrous reinforcements that can be utilized include glass fibers, asbestos, graphite fibers, synthetic organic fibers such as acrylonitrile, nylon, polyamide, polyvinyl alcohol and polyester fibers, and natural organic fibers such as cotton and sisal. The preferred fibrous reinforcements generally will be glass fibers which are available in a variety of forms including, for example, mats of chopped or continuous strands of glass, glass fabrics, chopped glass and chopped glass strands. The amount and type of fibrous reinforcing material to be utilized in any particular formulation can be determined readily by one skilled in the art.

Fillers can be added to the polyolefin compositions of the invention in place of or in addition to the fibrous reinforcing materials. Fillers act as extenders and impart or improve such properties as reduction in shrinkage and tendency to crack during curing. Fillers also tend to improve stiffness and heat resistance in molded articles. Examples of fillers that can be utilized in the method of the invention include inorganic materials such as alumina trihydrate, calcium carbonate, wood flour, clays, calcium silicate, silica, aluminum silicate, talcs, mica, barytes, dolomite, antimony trioxide, zinc borate, carbon black, solid or hollow glass spheres of various densities.

The particular filler chosen may be dependent upon the cost of such filler, the effect of the filler on mix viscosity and flow properties during extrusion, or the effect that the filler has on properties such as shrinkage, surface smoothness, chemical resistance, flammability and/or the electrical characteristics of the cured molded article. The amounts of filler included in the polyester resin formulations may vary up to about 70% by weight although 40–50% is a practical upper limit, and the amount preferred for any particular formulation can be determined readily by one skilled in the art. Useful fillers generally will have an average particle size of from about 1 to about 50 microns.

Mold release agents also can be included in the composition of the invention, and these are typically zinc, calcium, magnesium and lithium salts of fatty acids. Specific examples of mold release agents include zinc stearate, calcium stearate, magnesium stearate, lithium stearate, calcium oleate, zinc palmitate, etc. Amounts of up to about 5% of the mold release agent, and preferably from about 1 to about 5% of the mold release agent can be included in the mixture based upon the weight of the polyester and monomer.

Pigments also can be included in the compositions of the invention. Typical examples of pigments include carbon blacks, iron oxides, titanium dioxide and phthalocyanines. The pigment can be dispersed into the mixtures prior to extrusion as dry pigment powders or pre-dispersed forms in non-reactive carriers.

The following examples illustrate the method and compositions of the invention. Unless otherwise indicated, all parts and percentages are by weight.

EXAMPLE 1

A mixture is prepared by tumble blending a mixture comprising 97 parts of a maleated polypropylene available from Hercules under the trade designation "Hercoprime Resin A-35" and 3 parts of pentaerythritol. The molar ratio of pentaerythritol to unreacted maleic acid/anhydride is 45:1. The mixture is fed to an extruder whereupon the ingredients are melt blended to form a uniform blend and dispersion and thereafter extruded into strands. The strands are solidified by cooling and then pelletized.

EXAMPLE 2

A solution of 10 parts of resin A-35 in 100 parts of boiling toluene is prepared and 3 parts of 1,4-butanediol is added to the boiling solution. The molar ratio of 1,4-butanediol to unreacted maleic acid/anhydride is 33:1. The mixture is maintained at this temperature for an additional hour whereupon the reaction mixture is cooled and the desired product is obtained.

EXAMPLE 3

The procedure of Example 2 is repeated except that the butanediol is replaced by 5 parts of Carbowax No. 1000. The molar ratio of the Carbowax No. 1000 to unreacted maleic acid/anhydride is 50:1.

EXAMPLE 4

A mixture of 30 grams of resin A-35 and 1 gram of "RJ-100" (a styrene/allyl alcohol polymer available from Monsanto and containing 5.3 moles of hydroxyl group per mole of polymer) in 200 grams of toluene is prepared. The molar ratio of RJ-100 to unreacted maleic acid/anhydride is 5.55:1. The mixture is heated at the reflux temperature with stirring for 2 hours, cooled and the precipitate which forms is filtered and dried. The properties measured on molded bars are summarized in Table I.

EXAMPLE 5

A mixture of 30 grams of resin A-35 and 8 g (40% solution) of a hydroxy terminated polyether available under the trade designation HTE from B. F. Goodrich in 150 grams of toluene is prepared. The molar ratio of HTE to unreacted maleic acid/anhydride is 8.89:1. The mixture is heated at the reflux temperature with stirring for two hours. Upon cooling the mixture, 29 grams of the desired product is recovered and molded into bars. The properties of this product are summarized in Table I.

EXAMPLE 6

A mixture of 30 grams of resin A-35, 3 grams of pentaerythritol and 100 grams of toluene is heated at the reflux temperature (110° C.) with stirring for two hours. The molar ratio of pentaerythritol to unreacted maleic acid/anhydride is 144:1. The precipitate which forms on cooling is washed with methyl ethyl ketone and dried. Bars are molded at 220° C. and 1000 psi. The properties are summarized in Table I.

EXAMPLE 7

A mixture of 30 grams of resin A-35, 0.9 gram of hydroquinone, di-(beta hydroxyethyl)ether (from Eastman) and 150 grams of toluene is prepared. The molar ratio of the hydroquinone di-(beta hydroxyethyl)ether to unreacted maleic acid/anhydride is 15.15:1. The mixture is heated at 110° C. for 1 hour with stirring and the product is recovered. The properties of a molded bar are summarized in Table I.

EXAMPLE 8

A mixture of 30 grams of resin A-35, 0.9 gram of RJ-100 and 150 grams of toluene is prepared. The molar ratio of RJ-100 to unreacted maleic acid/anhydride is 5:1. The mixture is heated at 110° C. with stirring to form a solution whereupon 12.8 grams of 0.5 inch glass fiber (PPG 3303) are added. Stirring and heating are continued for one hour. After cooling the mixture, the product is removed and molded into bars. A summary of the properties is found in Table I.

EXAMPLE 9

A mixture of 30 grams of resin A-35 and 0.2 gram of RJ-100 in 200 grams of toluene is prepared. The molar ratio of RJ-100 to unreacted maleic acid/anhydride is 1.1:1. The mixture is heated at the reflux temperature with stirring for 2 hours, cooled and the precipitate which forms is filtered and dried. The properties measured on molded bars are summarized in Table I.

The effect on the properties of the reaction of an organic polyhydroxy compound with the graft-modified compounds described above is demonstrated by comparing some of the properties of the products obtained in accordance with the method of the invention with the properties of the corresponding graft-modified polyolefin which has not been reacted with a polyhydroxy compound (control) or in which, for example, the molar ratio of polyhydroxy compound to unreacted unsaturated polycarboxylic acid, ester or anhydride is only 1.1:1 (Example 9). The flexural strength of the compositions is determined according to ASTM D-790, flexural modulus is determined according to ASTM D-790, tensile strength is determined according to ASTM D-638, Rockwell hardness (M-scale) is determined according to ASTM D-785. The results obtained from these tests are summarized in Table I. The improvements in the properties of the products obtained in accordance with the method of the invention are apparent from a review of the data in the table.

TABLE I

| Property | Units | Control A-35 | Product of Example 4 | 5 | 6 | 7 | 8 | 9 |
|---|---|---|---|---|---|---|---|---|
| Heat Distortion | °C. at psi | 68 | 72 | 78 | 77 | 70 | 145 | 66 |
| Flexural Strength | × 10³ psi | 6.55 | 7.92 | 7.32 | 6.03 | 9.02 | 13.8 | 4.91 |
| Flexural Modulus | × 10⁵ psi | 2.29 | 2.57 | 3.13 | 2.37 | 2.76 | 6.52 | 2.29 |
| Impact Strength | Ft-lb/8in | 0.14 | 0.26 | 0.11 | 0.29 | 0.15 | 4.27 | * |
| Hardness | M | 36 | 41 | 41 | 38 | * | 50 | * |
| Tensile Strength | × 10³ psi | 3.57 | 5.92 | 4.39 | 2.85 | 5.49 | 12.2 | 3.70 |

*not determined

I claim:

1. A method of preparing polyolefin compositions having improved properties which comprises reacting
   (a) a graft-modified polyolefin obtained by reacting a polyolefin with an unsaturated polycarboxylic acid, ester or anhydride which is graft-polymerizable therewith, and
   (b) at least one organic polyhydroxy compound, the molar ratio of said organic polyhydroxy compound to unreacted unsaturated polycarboxylic acid, ester or anhydride in (a) being at least 5:1.

2. The method of claim 1 wherein the polyolefin in (a) is derived from at least one monoolefin containing from about 2 to 12 carbon atoms, or mixtures of one or more monoolefins with a diolefin containing up to about 12 carbon atoms.

3. The method of claim 1 wherein the polycarboxylic acid, ester or anhydride is a dicarboxylic acid, ester or anhydride.

4. The method of claim 3 wherein the dicarboxylic acid anhydride is maleic anhydride.

5. The method of claim 3 wherein the polyolefin is derived from polypropylene.

6. The method of claim 1 wherein the polyolefin of (a) is a copolymer of propylene with up to about 25 mole percent of another alpha olefin.

7. The method of claim 1 wherein the polyolefin is reacted in (a) with from about 0.1 to 10 weight percent of the polycarboxylic acid, ester or anhydride.

8. The method of claim 1 wherein the polyhydroxy compound is an aliphatic, cycloaliphatic or aromatic, monomeric or polymeric polyhydroxy compound.

9. The method of claim 8 wherein the polyhydroxy compound is an aliphatic polyhydroxy compound.

10. The method of claim 8 wherein the polyhydroxy compound is an aliphatic or aromatic polyetherpolyol.

11. A polyolefin composition prepared in accordance with the process of any one of claims 1 to 10.

12. The polyolefin composition of claim 11 also containing up to about 75 percent by weight of fibrous material and fillers.

13. A method of preparing polypropylene compositions having improved properties which comprises reacting
(a) a graft-modified propylene polymer obtained by grafting a propylene polymer with from about 0.1 to about 10 weight percent of maleic anhydride, with
(b) at least one organic polyhydroxy compound, the molar ratio of said organic polyhydroxy compound to unreacted maleic anhydride in (a) being at least 5:1.

14. The method of claim 13 wherein the graft-modified propylene polymer is reacted with from about 0.5 to about 10 percent by weight of at least one organic polyhydroxy compound.

15. The method of claim 14 wherein the polyhydroxy compound is an aliphatic polyhydroxy compound.

16. The method of claim 14 wherein the polyhydroxy compound is an aliphatic or aromatic polyetherpolyol.

17. A polypropylene composition prepared in accordance with the process of any one of claims 13 through 16.

18. The composition of claim 17 wherein the polypropylene composition is reinforced with up to about 50 percent by weight of glass fibers and fillers.

* * * * *